United States Patent
Garrison

(10) Patent No.: US 9,321,952 B2
(45) Date of Patent: Apr. 26, 2016

(54) METHOD OF CREATING A COMPOSITE CEMENT WITH ENHANCED PROPERTIES FOR USE IN OIL AND GAS WALLS

(71) Applicant: Greg Garrison, Katy, TX (US)

(72) Inventor: Greg Garrison, Katy, TX (US)

(*) Notice: Subject to any disclaimer, the term of this patent is extended or adjusted under 35 U.S.C. 154(b) by 53 days.

(21) Appl. No.: 14/246,126

(22) Filed: Apr. 6, 2014

(65) Prior Publication Data

US 2015/0284620 A1    Oct. 8, 2015

(51) Int. Cl.
*C04B 18/08*    (2006.01)
*C09K 8/46*    (2006.01)

(52) U.S. Cl.
CPC .......................................... *C09K 8/46* (2013.01)

(58) Field of Classification Search
CPC .................... C04B 18/08; C09K 8/46
See application file for complete search history.

(56) References Cited

U.S. PATENT DOCUMENTS 4,889,428 A * 12/1989 Hodson ................. B01F 7/0085
                                                                      241/253
2014/0096705 A1* 4/2014 Pike, Sr. ................. B02C 17/20
                                                                106/692

* cited by examiner

*Primary Examiner* — Paul Marcantoni
(74) *Attorney, Agent, or Firm* — Neal G. Massand

(57) ABSTRACT

This invention relates to using a unique blend of components of a composite cement and subjecting them to a rotary mill process using variably sized and shaped media to reduce the blends' particle size. The invention is novel in that it mills the blended materials together to achieve reduced particle size, increased particle surface area, higher compressive strength and lower permeability. In one embodiment, the invention combines fly ash or other pozzolan material with a cement of any type at varying rations between 1% and 99%.

5 Claims, 1 Drawing Sheet

| Cement | Inventive Sample # 1 | Inventive Sample # 2 | Inventive Sample # 3 | Inventive Sample # 4 | Prior Art Sample |
|---|---|---|---|---|---|
| Specific Surface Area (cm2/g) | 18,971 | 21,669 | 15,316 | 16,032 | 8,957 |

Figure 1

| Cement | Inventive Sample # 1 | Inventive Sample # 2 | Inventive Sample # 3 | Inventive Sample # 4 | Prior Art Sample |
|---|---|---|---|---|---|
| Mean Particle Size (μm) | 9.44 | 7.880 | 3.088 | 2.657 | 48.78 |
| Median Particle Size (μm) | 7.618 | 5.895 | 2.396 | 2.122 | 26.37 |

Figure 2

| Cement | Inventive Sample # 1 | Inventive Sample # 2 | Inventive Sample # 3 | Inventive Sample # 4 | Prior Art Sample |
|---|---|---|---|---|---|
| Specific Surface Area (cm2/g) | 18,971 | 21,669 | 15,316 | 16,032 | 8,957 |

METHOD OF CREATING A COMPOSITE CEMENT WITH ENHANCED PROPERTIES FOR USE IN OIL AND GAS WALLS

FIELD OF THE INVENTION

The present invention relates to a method of preparing a composite cement with increased reactivity and stability in order to improve suitability for certain applications, such as for use in oil and gas wells. The new composite cement illustrates broader range of mixing densities, improved inherent fluid loss control and low free fluid control. Set cement properties are improved as well with regard to higher strengths, lower permeability and greater durability as compared to conventional cement or blends currently used to achieve zonal isolation.

BACKGROUND OF THE INVENTION

Pozzolan cement is a type of hydraulic cement, meaning it reacts with calcium hydroxide and water to form a water resistant cementitious compound. The use of pozzolanic cements dates back to 500-400 BC, when the ancient Greeks used volcanic ashes.

The benefits of pozzolan cements and concretes are numerous. First, pozzolan materials are generally cheaper than their alternative, Portland cement. Second, the production of pozzolan cements is generally more environmentally friendly than Portland cements. For example, the production of Portland cement requires large amounts of energy, and as a result, enormous amounts of carbon dioxide are produced, along with numerous other pollutants. Third, the addition of pozzolan tends to increase durability of the end product. For example, Pozzolan concretes have been shown to outperform Portland concretes with regard to sulfate attacks and alkaline silicon reactivity attacks. Finally, many of the artificial pozzolans are industrial byproducts, such as blast furnace slag, the usage of which creates value and environmental savings where otherwise none would be.

Despite these advantages, many of the industrial byproduct pozzolans, such as blast furnace slag, are too costly or not always available. Other cheaper and more readily available pozzolans, such as fly ash, are not immediately suitable for use, but must be processed in order to be suitable for use as high quality cement. For instance, it has been shown that milling Class F fly ash to under 45 microns in diameter, results in the production of slag grade 100 or above concrete, as per ASTM C989.

With respect to the oil and gas industry, part of the process of preparing a well for further drilling, production or abandonment is cementing the well. Cementing protects and seals the wellbore. Part of the completion process of a prospective production well, cementing is used to seal the annulus after a casing string has been run in a wellbore. Additionally, cementing is used to seal a lost circulation zone, or an area where there is a reduction or absence of flow within the well. Also, cementing is used to plug a well prior to abandoning it.

Cementing is performed when a cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

Determining the required physical properties of the cement is essential before commencing cementing operations. Special mixers, including hydraulic jet mixers, re-circulating mixers or hatch mixers, are typically used to combine dry cement with water to create the wet cement, also known as slurry. Cement used in the well cementing processes can be one of the 5 different API types or even construction grade cement can be utilized.

Additives to the cement can include accelerators, which shorten the setting time required for the cement, as well as retarders, which do the opposite and make the cement setting time longer. In order to decrease or increase the density of the cement, lightweight and heavyweight additives are added. Nitrogen can be utilized as a means to reduce the density of the cement. Extenders, such as fly ash and sodium silicates, can be used to replace portions of the cement in an effort to reduce the cost of cementing.

The final size of the cement particles has a direct relationship with how much water is required to make a slurry without producing an excess of water at the top of the cement or in pockets as the cement hardens. In other words, the rate at which a cement particle hydrates when exposed to water greatly depends on its size. A small particle reacts much more quickly than a large particle and a very large particle, larger than about 50 µm, probably will never become fully hydrated, even if exposed to enough water. The particle size diameter is therefore critical in controlling the rate at which cements gain strength. The surface area increases inversely as the square of the mean particle diameter, therefore reducing the surface area by a factor of for example, live increases the area by 25, and because the new surface area is chemically fresh, it is more reactive.

Pozzolans consist generally of aspherical particles and spherical particles in the form of aluminio ferro silicate glass beads. Traditional milling techniques simply crush pozzolans, which fails to polish or grind the material. This results in non-active pozzolan particles as compared to rotary milled pozzolan. Using a combination of to rotatory mill with variably sized and shaped media, not only can fly ash be reduced to below 25 microns, but its surface area can be increased from the typical 0.695 m2/g to 1.263 m2/g, thus increasing the reactivity and stability of the resulting fly ash. Furthermore, the treatment described above both reduces the size of the non-spherical particles while at the same time roughing up the spherical particles, thereby increasing the surface area without reducing the flow ability of the pozzolan and results in a concomitant rise in reactivity.

One skilled in the art will recognize that despite increased reactivity and stability, fly ash with a particulate size of 25 microns or below is unsuitable in and of itself for use in oil and gas wells. It would be greatly beneficial to reduce the overall size of a composite cement to reduce the particle size of the entire blend.

Currently such fly ash is combined with other materials to form a composite cement. Often such added materials are of larger particle sizes than 25 microns, thus reducing the reactivity and slurry properties of the blended concrete. Even if the added particles are separately milled to a mean particle size of less than 25 microns, it is still possible to further improve the reactivity, stability, and slurry properties. Using the method described below, one can achieve mean particles sizes of 7 microns or below with surface areas of 153 m2/g.

SUMMARY OF THE INVENTION

This invention relates to using a unique blend of components of a composite cement and subjecting them to a rotary mill process using variably sized and shaped media to reduce the blends' particle size. The invention is novel in that it mills the blended materials together to achieve a particle topsize of 25 microns or less.

The invention provides a compelling solution to increasing reactivity, stability, and slurry properties of composite cement. To date, such composite cements are either separately milled to achieve smaller particle sizes, or are of differing particle sizes. One unmet need is for cheaper composite cements, suitable for use in oil and gas wells. One object of the invention is to achieve a particle with a topsize of less than 25 microns in blended cement, thus increasing the reactivity and stability and further improving the slurry properties, without destroying the spherical particles found within the fly ash component.

One advantage of the disclosed invention is creating composite cement material that can achieve zonal isolation in an oil and gas well. The disclosed invention utilizes the process of mixing fly ash with lime sources in a rotary mill to make a solid material that when added with water to create a slurry which can be pumped into an oil and gas well to achieve zonal isolation. A rotary milling process suitable for use in this invention is described in U.S. patent application Ser. No. 13/647,838, entitled Process for Treating Fly Ash and a Rotary Mill Therefor, of which the process or processes described in pages 5-24 and FIG. 1-4 are incorporated by reference as if fully set forth herein. This process along with the inventive technique solves as very compelling problem of creating a broad range of slurry densities that can be achieved without changing the solid blend, creating an exceptional set of cement properties across a wide range of densities. The inventive process can utilize the exact formula described or the process can replace the lime substitute with cement of any type or class with concentration ranges of between 1% to 99%. The varying ratios will produce different cement properties, all of which will form a slurry when added to water, which can achieve zonal isolation in an oil and gas well.

In one embodiment, the invention combines fly ash or other pozzolan material with a cement of any type at varying rations between 1% and 99%. The rotary mill process is implemented to reduce the particle sizes of cement and fly ash components to achieve an average mean size of less than 10 microns. The blended cement that results has an exceptional set of cement properties across a wide range of densities, suitable for offshore and land cementing operations.

In practicing the disclosed invention, to increase the surface area of untreated pozzolan a rotary mill employs different sizes and shapes of ceramic media and treats the pozzolan in a batch process for 30 minutes or longer. In summary, the surface area of both non-spherical and spherical particles can be increased by grinding the non-spherical particles and by roughing up the surface of the spheres. Both types of particles are treated in the rotary mill using a tailored mix of ceramic media. The mill essentially impacts the particles utilizing the tailored media so as to increase the surface area of the small spherical panicles to activate them while at the same time grinding non-spherical particles to a smaller and smaller diameter to provide a more reactive surface area without destroying the spherical particles of the pozzolan components. Then conventional fluid loss additives, dispersants and viscosity reducers may be added to the cement blends.

Table 1 below reflects advantages of an embodiment of the rotary milled composite cement of the invention.

TABLE 1

| Cement Weight and Type | 12.0 ppg Inventive Composite | 12.0 ppg Conv. Blend | 13.8 ppg Inventive Composite | 13.8 ppg Conv. Blend | 16.0 ppg Inventive Composite | 16.0 ppg Conv. Blend |
|---|---|---|---|---|---|---|
| Thickening Time (HR:MIN) | 6:45 | 4:55 | 5:36 | 7:00 | 6:33 | 4:46 |
| Temp. (° F.) | 180 | 180 | 180 | 180 | 180 | 180 |
| Compressive Strength (psi) | 1085 | 675 | 2317 | 982 | 4526 | 1980 |
| Permeability (mD) | .01 | .2 | .01 | .2 | .01 | .13 |

As can be seen from Table 1, the compressive strength of the inventive composite cement is greatly increased in comparison to a similarly weighted conventional cement. Additionally, the permeability of the inventive composite cement is greatly reduced in comparison to a similarly weighted conventional cement. The physical properties of the slurry and set composite cement are superior to conventional type extended or composite blends using fly ash. This includes all other inert fillers with cement blends that have not been subjected to the patented milling process. The compressive strength, permeability and resistance to chemical attack is drastically improved. The composite cement shows a wide range of mixing densities, improved fluid loss control and stability.

BRIEF DESCRIPTION OF THE DRAWINGS

Embodiments of the invention will now be described, by way of example, with reference to the accompanying drawings, wherein:

FIG. 1 is a chart showing a comparison of the mean particle size of a composite cement of the prior art with the mean particle size of a composite cement of the invention.

FIG. 2 is a chart showing a comparison of the average particle surface area of a composite cement of the prior art with a composite cement of the invention.

DETAILED DESCRIPTION

The following description provides details with reference to the accompanying drawings. It should be understood that the invention may be embodied in many different forms and should not be construed as limited to the embodiments set forth herein.

Referring to FIG. 1, mean particle size results were obtained using a Beckman Coulter LS Particle Size Analyzer. The procedure used in obtaining the data was a standard procedure well known to those of skill in the art. With respect to rotary milled cements incorporating the invention the mean particle sizes shown were 9.444, 7.880, 3.088, and 2.657 µm, respectively, and median particle sizes were 7.618, 5.895, 2.396, and 2.122 µm, respectively. On the other hand, an exemplary cement incorporated in the prior art showed a mean particle size of 48.78 µm and a median particle size of 26.37 µm.

Referring to FIG. 2, average particle surface area measurements were made using Coulter LS Particle Size Analyzer. The procedure used in obtaining the data was a standard procedure well known to those of skill in the art. With respect to rotary milled cements incorporating the invention, the specific surface area was 18,971 $cm^2$/g, 21,669 cm2/g, 15,316 cm2/g, and 16,032 cm2/g. On the other hand, an exemplary cement incorporated in the prior art exhibited a specific surface area of 8,957 cm2/g.

The invention claimed is:

1. A rotary milled composite cement for use in oil and gas wells comprising:
   1 to 99% of cement;
   1 to 99% of fly ash;
   a maximum particle size of 25 microns;
   a mean particle size of less than 12 microns; and
   an average particle surface area of at least 14,500 cm2/g.

2. A method of creating cement suitable for use in oil in gas wells comprising rotary milling:
   1 to 99% of cement; and
   1 to 99% of fly ash.

3. The method of claim 2 wherein the maximum particle size is 25 microns.

4. The method of claim 2 wherein the mean particle size is less than 12 microns.

5. The method of claim 2 wherein the average particle surface area is at least 14,500 $cm^2$/g.

* * * * *